US012571670B2

(12) United States Patent (10) Patent No.: US 12,571,670 B2

Von Dosky et al. (45) Date of Patent: Mar. 10, 2026

(54) DIAGNOSTIC METHOD FOR A FLOW MEASUREMENT APPARATUS WITH EFFECTIVE PRESSURE LINES WITH VIBRATION MEASUREMENT

(71) Applicant: Siemens Aktiengesellschaft, Munich (DE)

(72) Inventors: Stefan Von Dosky, Karlsruhe (DE); Daniel Labisch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/734,153

(22) Filed: Jun. 5, 2024

(65) Prior Publication Data

US 2024/0410738 A1 Dec. 12, 2024

(30) Foreign Application Priority Data

Jun. 7, 2023 (EP) ..................................... 23177972

(51) Int. Cl.
 *G01F 25/10* (2022.01)
 *G01F 1/42* (2006.01)
(52) U.S. Cl.
 CPC ............... *G01F 25/10* (2022.01); *G01F 1/42* (2013.01)
(58) Field of Classification Search
 CPC ...... G01N 13/008; G01N 11/08; G01F 25/10; G01F 1/42; G01F 1/40; G01F 1/36;
 (Continued)

(56) References Cited

U.S. PATENT DOCUMENTS

| | | | | |
|---|---|---|---|---|
| 4,249,164 A | * | 2/1981 | Tivy | ........................... G01F 1/42 |
| | | | | 340/611 |
| 2004/0128034 A1 | * | 7/2004 | Lenker | ................. G05D 7/0635 |
| | | | | 700/282 |
| 2004/0249583 A1 | * | 12/2004 | Eryurek | ............... G05D 7/0635 |
| | | | | 702/47 |

(Continued)

FOREIGN PATENT DOCUMENTS

| | | |
|---|---|---|
| CN | 1346435 | 4/2002 |
| CN | 1898535 | 1/2007 |

(Continued)

OTHER PUBLICATIONS

Qing, Mao & Jinghui, Zhang & Yushan, Luo & Haijun, Wang & Quan, Duan. (2006). Experimental studies of orifice-induced wall pressure fluctuations and pipe vibration. International Journal of Pressure Vessels and Piping—Int J Pressure Vessels Piping. 83. 505-511. 10.1016/j.ijpvp.2006.03.010. (Year: 2006).*

(Continued)

*Primary Examiner* — Lisa M Caputo
*Assistant Examiner* — Eric Sebastian Von Wald
(74) *Attorney, Agent, or Firm* — Cozen O'Connor

(57) ABSTRACT

A flow measurement system, a simulation program product, use of a vibration sensor for detecting a blockage and a diagnostic method for a flow measurement system attached to flow-traversable piping in which an orifice plate is disposed, wherein a fluid flows through the piping and the effective pressure is acquired in an effective pressure line, a vibration variable of a vibration is acquired via a vibration sensor mounted in the region of the orifice plate, blockage of the effective pressure line is detected if the magnitude of the acquired effective pressure is below an adjustable first threshold value and the magnitude of the acquired vibration variable is above an adjustable second threshold value, where a warning is output to a user and/or a data interface if a blockage of the effective pressure line is detected.

19 Claims, 3 Drawing Sheets

(58) Field of Classification Search
CPC ..... G01F 1/34; G01F 1/05; G01F 1/46; G01F 1/363; G01F 1/8436; G01F 1/88; G01F 7/005; G05B 23/0283
See application file for complete search history.

(56) References Cited

U.S. PATENT DOCUMENTS

| | | | |
|---|---|---|---|
| 2005/0132808 A1 | 6/2005 | Brown et al. | |
| 2006/0277000 A1 * | 12/2006 | Wehrs ..................... G01F 15/00 | |
| | | | 702/183 |
| 2009/0326839 A1 | 12/2009 | Rogers et al. | |
| 2011/0083515 A1 | 4/2011 | Phillips | |
| 2011/0146415 A1 | 6/2011 | Tabaru | |
| 2017/0286572 A1 | 10/2017 | Hershey et al. | |
| 2018/0253111 A1 | 9/2018 | Goto | |
| 2023/0341247 A1 * | 10/2023 | Kirst ..................... G01F 1/8436 | |

FOREIGN PATENT DOCUMENTS

| | | | |
|---|---|---|---|
| CN | 102169044 | 8/2011 | |
| CN | 108139761 | 6/2018 | |
| CN | 211373723 | 8/2020 | |
| CN | 114983307 | 9/2022 | |
| DE | 2831649 | 1/1980 | |
| DE | 102006004582 | 8/2007 | |
| KR | 101847410 B1 * | 4/2018 | .............. H04W 4/70 |
| WO | 0169182 | 9/2001 | |

OTHER PUBLICATIONS

Takahashi, Kei & Matsuda, Hiroyuki & Miyamoto, Hirofumi. (2001). Cavitation Characteristics of Restriction Orifices. Proceedings of the Fourth International Symposium on Cavitation-CAV2001. (Year: 2001).*

Qing, Mao & Yixiong, Zhang & Wenyuan, Xiang & Bi, Qincheng & Huixiong, Li & Fenggang, Zang. (2003). High-level Vibration and Noise Analysis of Nuclear Pipes with Orifice. (Year: 2003).*

Lee, J.S. & Lee, K.B. & Lee, C.G.. (2001). An experimental study on the control of pressure transients using an orifice. International Journal of Pressure Vessels and Piping. 78. 337-341. 10.1016/S0308-0161(01)00046-1. (Year: 2001).*

* cited by examiner

DIAGNOSTIC METHOD FOR A FLOW MEASUREMENT APPARATUS WITH EFFECTIVE PRESSURE LINES WITH VIBRATION MEASUREMENT

BACKGROUND OF THE INVENTION

1. Field of the Invention

The invention relates to a diagnostic method for a flow measurement apparatus with effective pressure lines, a computer program product with which the diagnostic method can be implemented, an evaluation unit, a correspondingly equipped flow measurement system and a simulation program product, and further relates to the use of a vibration sensor for detecting a blockage in an effective pressure line.

2. Description of the Related Art

Patent application DE 10 2006 004 582 A1 discloses a method for diagnosing a blockage of an impulse line in a pressure transducer. Here, a differential pressure transducer is connected to piping via a first and a second impulse line. A differential pressure is determined on two impulse lines and, if necessary, individual pressures. Based thereon, a characteristic value is determined and compared with a reference value.

International application WO 01/69182 A2 discloses a sensor device for flow measurement which is attached to fluid-conveying piping. The sensor device comprises a vibration sensor that is coupled to an evaluation unit. The vibration sensor is formed as a piezo film sensor. The evaluation unit is used to determine a flow parameter based on vibration variables.

US Pub. No. 2009/0326839 A1 discloses a diagnostic method for a flow measurement apparatus that is connected to a differential pressure measuring apparatus via two effective pressure lines. The effective pressure lines are attached to piping to measure effective pressure in the region of an orifice plate in the piping. During normal operation, the conveyed fluid flows through the orifice plate in the piping.

Flow measurement apparatuses with orifice plates are used in a variety of industrial applications. Such flow measurement apparatuses can become inoperable due to contamination during operation. Such flow measurement apparatuses are also subject to wear. There is therefore a need for a diagnostic facility with which it is possible to detect failure and/or wear in such a flow measurement apparatus in a reliable and cost-efficient manner.

SUMMARY OF THE INVENTION

In view of the foregoing, it is an object of the invention to provide a facility that offers an improvement in at least the detection of failure and/or wear in a flow measurement apparatus in a reliable and cost-efficient manner.

This and other objects and advantages are achieved in accordance with the inventive by a diagnostic method that is used to diagnose a flow measurement system comprising a flow measurement apparatus. The flow measurement system is attached to piping through which a fluid, i.e., a liquid or a gas, can flow. An orifice plate is disposed in the piping. A flow-rate-dependent pressure difference can be generated upstream and downstream of the orifice plate. The flow measurement system comprises at least two effective pressure lines that are connected to the flow measurement apparatus. A pressure obtaining in the region of the orifice plate, i.e., upstream or downstream, can be acquired via the at least two effective pressure lines. For this purpose, one of the effective pressure lines for capturing a pressure is disposed upstream of the orifice plate and one of the effective pressure lines is disposed downstream of the orifice plate. The terms "upstream" and "downstream" relate to the direction of flow. The effective pressure lines are disposed far enough upstream or downstream of the orifice plate to ensure that the pressure effects of the orifice plate can still be evaluated in a technically meaningful way at the flow rates to be measured.

The inventive diagnostic method comprises a first step in which a fluid is passed through the piping and an effective pressure is acquired on at least one effective pressure line. In a second step of the diagnostic method, a vibration variable of a vibration is acquired. For this purpose, a vibration sensor is used, which is mounted in the region of the orifice plate. The vibration sensor can be located far enough from the orifice plate along an axial direction of the pipe to ensure that a vibration variable occurring there can still be evaluated in a technically meaningful way, i.e., for example, with a sufficient signal-to-noise ratio. The vibration variable can be an amplitude, a frequency and/or a variable derived therefrom.

In addition, the inventive diagnostic method has a third step in which a blockage is detected in the effective pressure line on which the effective pressure is acquired in the first step. The blockage is detected if the magnitude of the effective pressure acquired in the first step is below an adjustable first threshold value and the magnitude of the vibration variable acquired in the second step is above an adjustable second threshold value. Undershooting of the first adjustable threshold value and exceedance of the second adjustable threshold value can essentially occur simultaneously or within a predefinable detection interval. The fact that the effective pressure is below the first adjustable threshold value indicates that the corresponding effective pressure line is potentially clogged, i.e. blocked, or that there is an insufficient flow rate through the piping. If there is essentially a sufficiently strong vibration at the same time, i.e., the magnitude of the vibration exceeds the second adjustable threshold value, then this indicates that the medium continues to flow through the orifice plate. Consequently, the fact that the second adjustable threshold value is exceeded verifies that an absolute-value drop in the effective pressure below the first threshold value is caused by a blockage of the corresponding effective pressure line. The vibration for which the vibration variable is acquired in the second step is caused by non-stationary flow phenomena at the orifice plate. In particular, turbulences are caused in the fluid when it flows through the orifice plate, causing vibration. In addition, in the diagnostic method in accordance with the invention, a warning is issued to a user and/or a data interface if a blockage present in the corresponding effective pressure line is detected.

The first and second threshold values can each be specified, i.e., set, by a user input, a lookup table, a characteristic curve, an algorithm and/or artificial intelligence. The diagnostic method in accordance with the invention can therefore be adapted to suit a wide range of pipe sizes and orifice plates of different sizes and designs. The first and/or second threshold value can also be optimized by machine learning. In addition to the orifice plate and the effective pressure line, the diagnostic method in accordance with the invention does not require any other components that affect the flow in the lumen of the piping. Moreover, a vibration sensor can be easily retrofitted in the region of an orifice plate. The diagnostic method in accordance with the invention can therefore be applied quickly and cost-effectively to existing piping with built-in orifice plate.

In one embodiment of the disclosed diagnostic method, the orifice plate is attached to at least one annular flange through which a first and a second pipe constituting the piping are connected. The annular flange can be structured to encompass the orifice plate at its outer circumference and thereby fix it in place. A vibration caused by the flow through the orifice plate is thus transmitted to the annular flange. The vibration sensor can also be attached to the annular flange or to the piping itself, i.e., to the first or second pipe. Sufficiently strong vibrations are present there, which can also be accurately acquired using relatively simple vibration sensors. Consequently, the inventive diagnostic method can be implemented in a cost-effective manner.

In addition, the inventive diagnostic method can also comprise a fourth step in which artificial intelligence is trained based on effective pressure measurements and at least one vibration variable. Complementarily, a flow rate determined with the flow measurement apparatus can also be used for training. A reference state of the orifice plate is determined by training in the fourth step. The reference state can, for example, be a GO-state that is present after the installation of a new orifice plate. The diagnostic procedure can also have a fifth step in which orifice plate wear is detected. The reference state, which is determined in the fourth step, is compared with an effective pressure present, at least one vibration variable present and/or a variable derived individually or in combination. In addition, a flow rate determined by the flow measurement apparatus can also be used for the comparison in the fifth step. The comparison in the fifth step makes it possible to quantify the extent to which the orifice plate deviates from the reference state and whether it is necessary to replace the orifice plate. An expected operating time until the orifice plate needs to be replaced can also be determined. The expected operating time can be determined based on information about particle content and/or particle composition in the fluid. Particles have an abrasive effect that depends, among other things, on their hardness, sharpness and concentration in the fluid. Orifice plates are durable and exhibit constant characteristics over reasonably long operating periods. Accordingly, the reference state can be reliably taught by training, especially in the case of machine learning. This also applies to determining the expected operating time until the orifice plate needs to be replaced.

In a further embodiment of the inventive diagnostic method, the flow measurement apparatus is formed as a differential pressure measuring apparatus. The differential pressure measuring apparatus is suitable for determining a differential pressure between the at least two effective pressure lines, which is a measure of the flow rate of the fluid at the orifice plate. The effective pressure lines can be disposed upstream and downstream of the orifice plate along the direction of flow. Such flow measurement apparatuses are more susceptible to blocked effective pressure lines, so that faults occurring during operation can be detected quickly using the diagnostic method in accordance with the disclosed embodiments.

In addition, the effective pressure lines can have a length of 1 m to 20 m in each case. This means that the effective pressure or effective pressures can be measured at a distance from the vibration sensor. The vibration sensor and the flow measurement apparatus at which the effective pressure lines end can each be coupled to an evaluation unit via a communicative data link. The communicative data link can be formed as a wired connection or as a radio connection. The hardware used for the inventive diagnostic method is therefore modular. In particular, the vibration sensor can be selected independently of the flow measurement apparatus.

In addition, the vibration that is acquired by the vibration sensor in the second step can be oriented perpendicular to an axial direction of the piping. In particular, the detected vibration can be oriented perpendicular to the axial direction of the piping in the region of the orifice plate. The axial direction is defined by a pipe axis of the piping. Accordingly, the vibration sensor acquires vibration in the radial direction. Vibrations caused by flow through the orifice plate have an increased amplitude in the radial direction due to the shape of the pipes and/or of the annular flange. As a result, an increased signal-to-noise ratio (SNR) can be achieved. Consequently, the achievable accuracy in capturing the vibrations is increased, which in turn allows early detection of a blockage in the corresponding effective pressure line. This improves the warning effect.

In a further embodiment of the diagnostic method, the method can comprise a sixth step in which a first measured value for the flow rate of the fluid in the piping is determined. The first measured value of the flow rate is determined based on the effective pressure acquired in the first step. The diagnostic method also comprises a seventh step in which a second measured value for the flow rate is determined. The second measured value of the flow rate is determined based on the vibration variable acquired in the second step. Artificial intelligence is used to determine the second measured value of the flow rate. In addition, in accordance with the diagnostic method, the first measured value is compared with the second measured value. The comparison is used to check the mutual plausibility of the measured values. For example, a difference between the first and second measured values can be determined and compared, in terms of magnitude, against a predefinable limit value. If the magnitude of the difference determined is less than the specified limit value, then an operational state of the flow measurement system is detected. If, on the other hand, the magnitude exceeds the predefinable limit value, it is detected that the vibration sensor, an effective pressure line or the flow measurement apparatus is in an abnormal state. If an abnormal state is detected, then a warning can be issued to the user and/or the data interface. The vibration sensor and the effective pressure lines or the flow measurement apparatus are based on different physical operating principles and are therefore mutually diverse. Accordingly, the diagnostic method in accordance with the disclosed embodiments allows reliable detection of whether the flow measurement system, including the vibration sensor, is still functional. As a result, the disclosed diagnostic method is self-monitoring. In addition, a comparison between the first and second measured values can be used to detect wear on the orifice plate. For example, abrasion of the orifice plate results in a decrease in the differential pressure that can be acquired via the effective pressure lines under constant flow conditions. However, the creation of turbulences at the orifice plate is only slightly affected by abrasion. The difference between the first and second measured values can therefore be used to determine wear on the orifice plate.

The objects and advantages in accordance with the invention are also achieved by an inventive computer program product which is configured to receive and process effective pressure measurements and at least one vibration variable. In accordance with the invention, the computer program product is configured to implement at least one embodiment of the above-described diagnostic method. The computer program product can be hardwired, formed as software, or a combination thereof. In particular, the computer program product can be at least partially implemented as a chip, an integrated circuit and/or a Field-programmable gate array (FPGA). In addition, the computer program product can be of monolithic design, i.e., it can be executed on a single hardware platform. Alternatively, the computer program product can be of modular design and comprise a plurality of subprograms that run on different hardware platforms and interoperate via communicative data links, such as an Internet connection. In particular, the computer program product can be configured to execute on a computer cloud.

The objects and advantages in accordance with the invention are also achieved by an evaluation unit in accordance with the invention. The evaluation unit has a memory and a computing unit (processor) and is suitable for storing and executing a computer program product. The evaluation unit can be coupled at least to a flow measurement apparatus and a vibration sensor. Alternatively, the evaluation unit can be part of the flow measurement apparatus and can be coupled to the vibration sensor via the communicative data link. In accordance with the invention, a computer program product configured in accordance with one of the above-described embodiments is stored in an executable manner on the evaluation unit. The disclosed computer program product can also be executed quickly on hardware using relatively low computing power. Accordingly, the underlying diagnostic method can be implemented using a simple and cost-efficient evaluation unit.

The objects and advantages in accordance with the invention are also achieved by an inventive flow measurement system comprising a flow measurement apparatus and a vibration sensor. The vibration sensor can be attached directly to the piping in the area of an orifice plate and the flow measurement apparatus can be attached indirectly via at least one effective pressure line. The flow measurement apparatus and the vibration sensor are each connected via a communicative data link to an evaluation unit which is also part of the flow measurement system. In accordance with the invention, the evaluation unit is configured in accordance with the above-described embodiments.

The objects and advantages in accordance with the invention are also achieved by a simulation program product in accordance with the invention. The simulation program product comprises instructions which, when executed, cause a computer to simulate an operating behavior of a flow measurement system. The flow measurement system is inventively configured in accordance with the above-described embodiments. The simulation program product is configured to be used for simulating the operating behavior of a correspondingly configured flow measurement system.

The simulation program product can have a digital mapping of the flow measurement system in which its structure is simulated. The simulation program product can also comprise a physics module that is configured to simulate the operating behavior of the digital mapping under predefinable operating conditions. The predefinable operating conditions can include density, flow rate, viscosity and/or composition of a fluid flowing through the piping to which the flow measurement system is attached, during the operation to be simulated or simulated. In particular, one of the predefinable operating conditions that can clog or block an effective pressure line can be contamination of the fluid with suspended matter. The physics module can also be configured to simulate the flow behavior of the fluid at the orifice plate, in particular the formation of turbulences downstream of the orifice plate. The orifice plate can be structured rotationally symmetrical in a central area. The invention is based, among other things, on the realization that, due to its rotational symmetry, a sufficiently accurate fluid dynamics simulation of the orifice plate can be achieved by simulating only a circumferential section of the orifice plate. Consequently, the computer program product can include a two-dimensional fluid simulation of a longitudinal section of the orifice plate or a three-dimensional fluid simulation of a circumferential section of the orifice plate. Accordingly, turbulences downstream of the orifice plate in the direction of flow can be simulated with relatively little computational overhead. The two-dimensional or three-dimensional fluid simulation can be performed when the simulation program product is executed. Due to the reduced computational complexity, the simulation program product can be configured to be real-time-capable. In turn, the vibrations caused by the turbulences can be determined with reduced computational effort. This, in turn, allows simplified simulation of vibrations caused in this way. Vibrations can also be determined based on the turbulences determined by the two-dimensional or three-dimensional fluid simulation when the simulation program product is executed. Overall, a large number of such flow measurement systems can also be simulated realistically with relatively little computing overhead, which in turn allows precise monitoring, for example on an automation system in which the flow measurement system is used.

The simulation program product can be formed as a "digital twin", as described in more detail, for example, in US Pub. No. 2017/286572 A1, the content of which is incorporated herein by reference in its entirety. The simulation program product can be configured to be executed on a higher-level control unit and to transfer simulation results to a control program on the higher-level control unit. The control program can, in turn, intervene in the operation of the automation system based on the simulation results. The features of the underlying diagnostic method and flow measurement system are readily transferable to the simulation program product.

The objects and advantages are in accordance with the invention are also achieved by inventive use of a vibration sensor. The vibration sensor is attached to piping in which an orifice plate is disposed. The orifice plate is configured to measure a flow rate of a fluid in the piping in conjunction with a flow measurement apparatus. The vibration sensor is attached directly or indirectly to the piping in the region of the orifice plate and is configured to acquire vibrations present there. The vibration sensor is inventively used to detect a blockage in an effective pressure line. The effective pressure line is configured to pick up an effective pressure in the area of the orifice plate and acquire it in conjunction with the flow measurement apparatus. The effective pressure acquired by the effective pressure line is used to measure the flow rate in the pipe during operation of the flow measurement apparatus which is part of a flow measurement system.

The flow measurement system is configured in accordance with the above-described embodiments. The features of the diagnostic method, the associated computer program product, the evaluation unit and the flow measurement system are readily transferable to the disclosed use.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be explained in more detail with reference to an embodiment depicted in the accompanying figures. The figures are to be read as complementary to one another in that the same reference characters have the same technical meaning in different figures. In addition, the features of the embodiment shown in the figures can be combined with the features outlined above, in which.

DETAILED DESCRIPTION OF THE EXEMPLARY EMBODIMENTS

Figure 1:
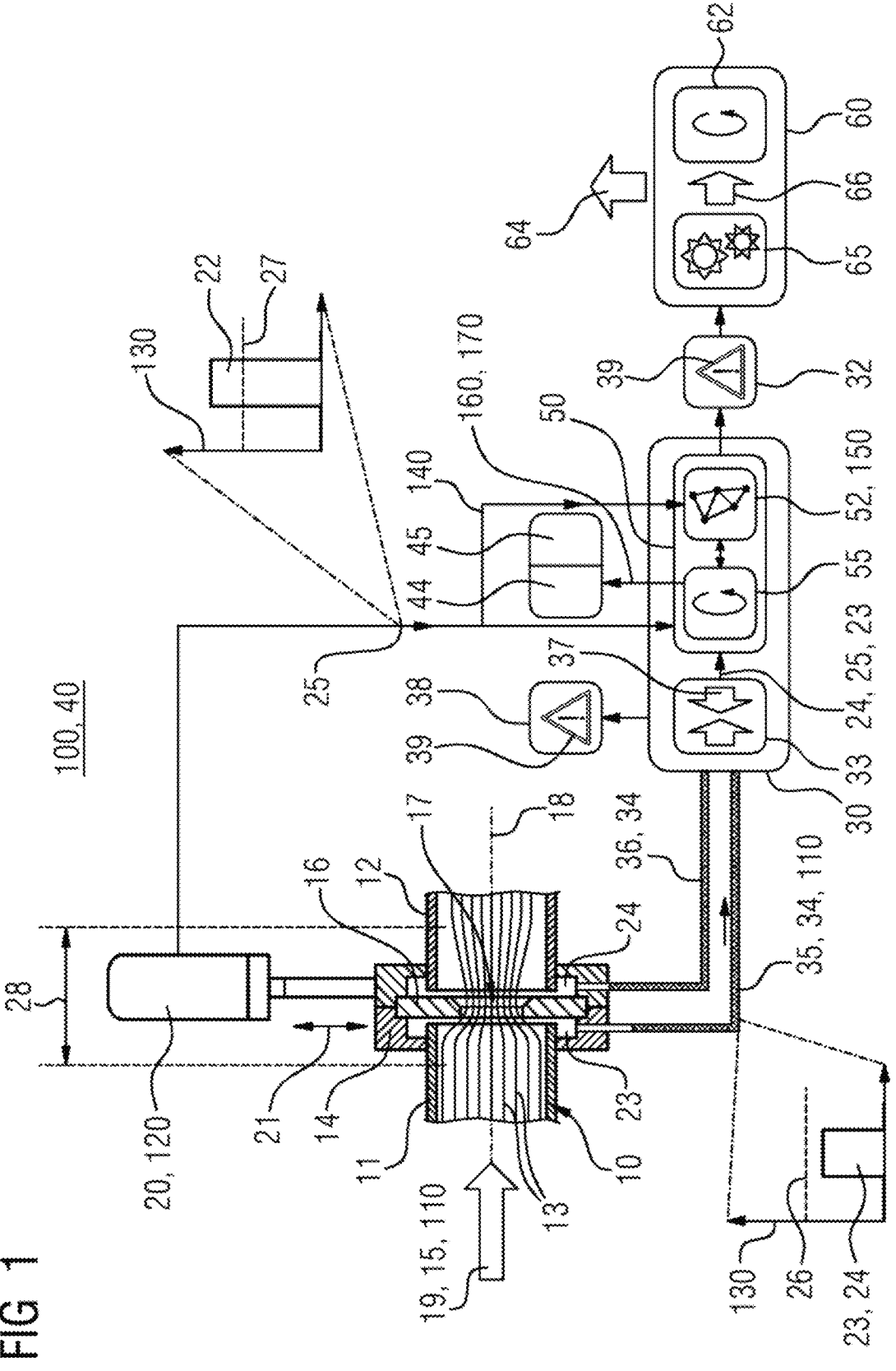
FIG. 1 shows a schematic illustration of a flow measurement system at one stage of a first embodiment of the inventive diagnostic method.

FIG. 1 schematically shows an illustration of a flow measurement system 40. A first embodiment of a diagnostic method 100, shown in one stage in FIG. 1, is implemented on the flow measurement system 40. The flow measurement system 40 comprises a flow measurement apparatus 30 connected to an annular flange 14 via effective pressure lines 34. The first and second effective pressure lines 35, 36 are each configured to pick up a first and second effective pressure 23, 24 respectively present and to transmit it hydraulically to the flow measurement apparatus 30. The annular flange 14 connects a first and a second pipe 11, 12 constituting piping 10 in which a flow rate 19 is to be measured in a fluid 13 flowing therein. An orifice plate 16, through which the fluid 13 can flow, is disposed between the first and second pipe 11, 12. The orifice plate 16 has an essentially central opening 17 of circumferential, in particular circular, configuration. The opening 17 is essentially centered on a pipe axis 18, along which the piping 10 extends at least in sections, and which defines its axial direction. Following a flow direction 15 of the fluid 13, there is a region 28 of the orifice plate 16 in which fluid dynamic effects can be measured in a technically meaningful way.

A vibration sensor 20 is attached to the annular flange 14 in the region 28 of the orifice plate 16. The vibration sensor 20 is configured to acquire vibrations 21 on the annular flange 14. The vibrations 21 are essentially radial in relation to the pipe axis 18 and/or the flow direction 15. The vibration sensor 20 is connected to the flow measurement apparatus 30 and is suitable for transmitting measured values 25 of a vibration variable 22 to the flow measurement apparatus 30. The vibration sensor 20 can be thermally insulated from the annular flange 14 by its mounting.

The flow measurement apparatus 30 comprises a differential pressure measuring apparatus 33 that is hydraulically connected to the effective pressure lines 34, i.e., the first and second effective pressure lines 35, 36. The differential pressure apparatus 33 is also configured to transmit at least one measured value 25 for the first and/or second effective pressure 24 to an evaluation unit 50. The differential pressure measuring apparatus 33 is also configured to determine a differential pressure 37 between the first and second effective pressure lines 35, 36. The differential pressure 37 constitutes a measure of the flow rate 19 in the fluid 13. The pressure measuring device 30 incorporates the evaluation unit 50. Alternatively, the evaluation unit 50 can also be separate from the pressure measuring device 30 and connected to it. The evaluation unit 50 has a memory (not shown in detail) and a computing unit or processor (not shown in detail) which are configured to run/execute computer programs thereon. The evaluation unit 30 is also connected to a display apparatus 38. In addition, the evaluation unit 50, and thus also the evaluation unit 30, is connected to a higher-level control unit 60 via a data interface 32. There is thus a communicative data link between the evaluation unit 50 and the higher-level control unit 60. The higher-level control unit 60 likewise has a memory (not shown in detail) and a computing unit or processor (not shown in detail) and is suitable for running/executing computer programs thereon. In addition, the higher-level control unit 60 is configured to issue control commands 64 with which an automation system to which the piping 10 belongs can be controlled. The flow measurement system 40 is mapped in a simulation program product 65 which is configured to simulate an operating behavior of the flow measurement system 40. The simulation program product 100 can be used among other things to check the plausibility of the diagnostic method 100, i.e., a warning 39 issued by it. For this purpose, the simulation program product 65 is formed as a digital twin of the flow measurement system 65. The simulation program product is executed on the higher-level control unit 60 and is configured to transmit simulation results 66 to a control program 62 that is also executed on the higher-level control unit 60.

The diagnostic method 100 comprises a first step 110 in which the fluid 13 is passed through the piping 10. During the first step 110, the first effective pressure 23 is acquired. The first effective pressure 23 is acquired via the flow measurement apparatus 30. The diagnostic method 100 also includes a second step 120 which can be performed simultaneously, before or after the first step 110. In the second step 120, at least one vibration variable 22 is acquired by means of the vibration sensor 20. The vibration variable 22 is a measure of the intensity of the vibration 21 which is present in the region 28 of the orifice plate 16. The first and second steps 110, 120 are performed in a coordinated manner such that a measured value 25 for the first effective pressure 23 and a measured value 25 for the vibration variable 22 appertain to a common measuring point, i.e., are measured essentially at the same time.

The diagnostic method 100 also includes a third step 130 that can be performed upon completion of the first and second steps 110, 120. In the third step 130, a check is performed to determine whether the magnitude of the first effective pressure 23 is below an adjustable first threshold value 26. The amount by which the pressure is below the adjustable first threshold value 26 is shown as a graph in FIG. 1. The adjustable first threshold value 26 can be predefined by a lookup table, a user input, an algorithm or artificial intelligence. Similarly, in the third step 130, a check is performed to determine whether the vibration variable 22 acquired in the second step 120 exceeds an adjustable second threshold value 27 in terms of magnitude. The amount by which the adjustable threshold value 27 is exceeded is shown correspondingly as a graph in FIG. 1. Similarly to the first threshold value 26, the second threshold value 27 can be predefined by a lookup table, a user input, an algorithm or artificial intelligence. If the magnitude of the first effective pressure 23 is below the adjustable first threshold value 26 and the magnitude of the vibration variable 22 exceeds the second threshold value 27, then blockage of the first effective pressure line 35 is detected in the third step 130.

The vibration variable 22 that exceeds the second threshold value 27 indicates that there is flow through the orifice plate 16. The first effective pressure 23 indicates that, with flow through the orifice plate 16 in the intended state of the first effective pressure line 35, the first effective pressure 23 acquired via it is sufficiently high and exceeds the adjustable first threshold value 26. A blockage of the first effective pressure line 35 causes the first effective pressure 23 to be no longer measurable by the flow measurement apparatus 30. The vibrations 21 detected by the vibration sensor 20 are caused by the flow through the orifice plate 16. The vibration variable 22 is a different physical quantity than the first effective pressure 23, so that a diverse concept is realized with the diagnostic method 100 via the vibration sensor 20. When the blockage of the first effective pressure line 35 is detected, a corresponding warning 39 is output to the user via the display apparatus 38. The corresponding warning 39 is likewise output to the higher-level control unit 60 via the data interface 32.

In addition, the diagnostic method 100 has a fourth step 140, which can be performed before, during or after the first, second and third steps 110, 120, 130. In the fourth step 140, measured values 25 of the vibration variable 22 and the first effective pressure 23 are obtained. These are used as training data to train artificial intelligence 52. The artificial intelligence 52 is run/executed on the evaluation unit 50 and is suitable for interacting with a computer program product 55 with which the diagnostic method 100 is implemented. The computer program product 55 is also executed on the evaluation unit 50. In the fourth step 140, machine learning is used to determine a reference state that is suitable as a starting point for monitoring wear behavior of the orifice plate 16. The reference state may, for example, be present immediately after a new orifice plate 16 has been installed and thus indicate a GO-state.

The diagnostic method 100 additionally comprises a fifth step 150 in which wear of the orifice plate 16 is detected by comparing the reference state determined in the fourth step 140 with a first effective pressure 35 present, a vibration variable 22 present and/or a variable derived therefrom. The fifth step 150 can also be performed by means of the artificial intelligence 52. The fifth step 150 can be performed during operation of the flow measurement system 40.

The diagnostic method 100 also comprises a sixth step 160 which can be performed before, during or after the first, second, third, fourth or fifth step 110, 120, 130, 140, 150. In the sixth step 160, a first measured value 44 for the flow rate 19 in the piping 10 is determined. The first measured value 44 for the flow rate 19 is determined based on at least the first effective pressure 35 acquired in the first step 110. In particular, the first measured value 44 can be determined based on the differential pressure 37, which in turn is determined based on the first and second effective pressures 35, 36. The diagnostic method 100 also has a seventh step 170 in which a second measured value 45 for the flow rate 19 in the piping 10 is determined. The second measured value 45 is determined using the vibration variable 22 acquired in the second step 120. The second measured value 45 for the flow rate 19 can, for example, be determined by artificial intelligence. In the diagnostic method 100, the first and second measured values 44, 45 for the flow rate 19 are further compared with each other. The comparison is used to check the plausibility of the first and second measured values 44, 45. The more the first and second measured values 44, 45 differ from one another, the greater the likelihood that the vibration sensor 20, one of the effective pressure lines 34 or the flow measurement apparatus 30, in particular the differential pressure measuring apparatus 33, is in an abnormal state. Accordingly, the sixth and seventh steps 160, 170 are used to monitor the operation of the flow measurement system 40. The individual steps 110, 120, 130, 140, 150, 1670, 170 are performed by the computer program product 55 that is executed on the evaluation unit 50. The diagnostic procedure 100 outlined for the first effective pressure 23 and the first effective pressure line 35 can also be performed for the second effective pressure 24 on the second effective pressure line 36, or a combination thereof.

Figure 2:
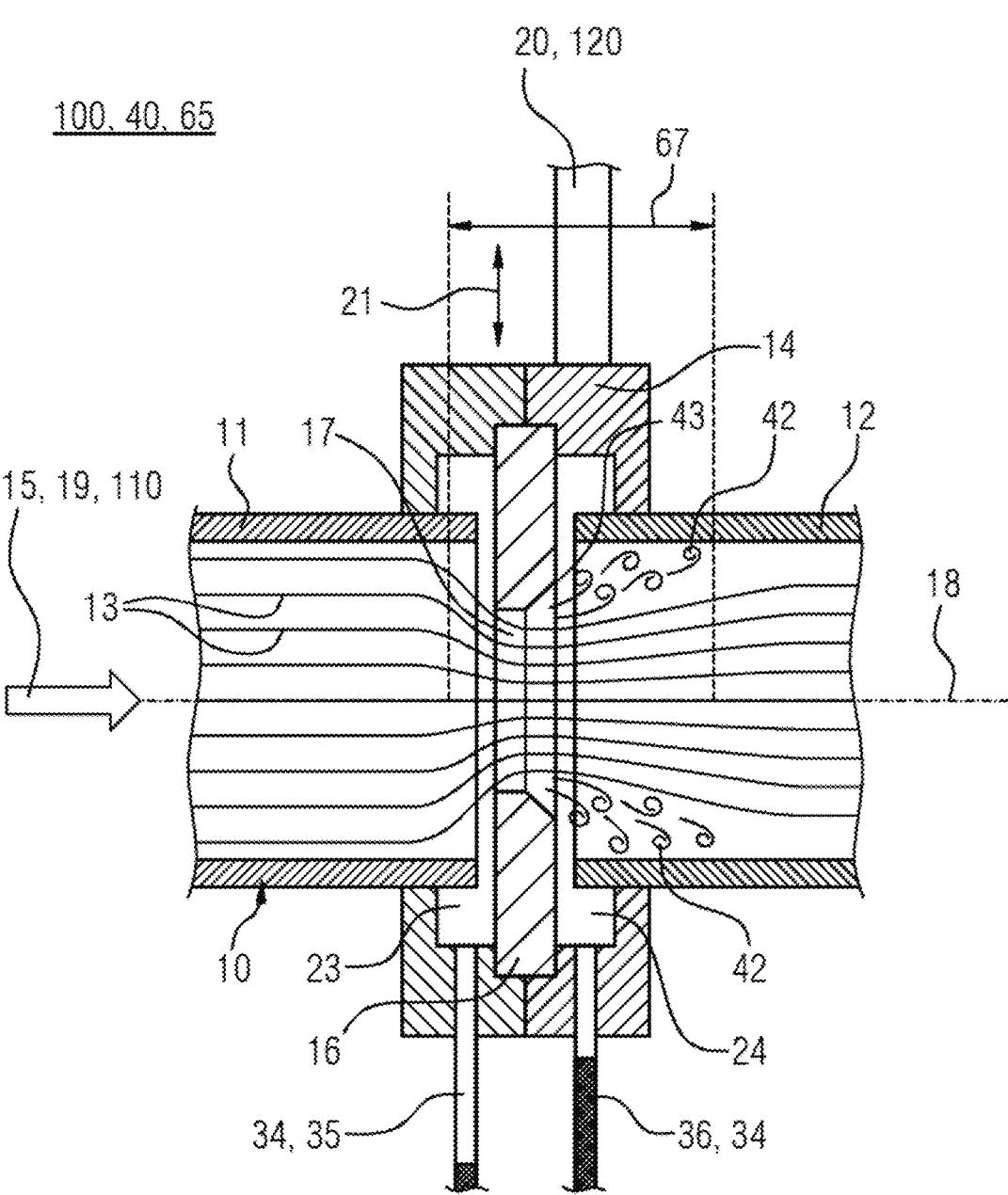
FIG. 2 shows a detailed view of the inventive flow measurement system.

A detailed view of the flow measurement system 40 of FIG. 1 is shown schematically in longitudinal section in FIG. 2. In FIG. 2, the diagnostic method 100 is implemented on the flow measurement system 40. The fluid 13, which flows through the first pipe 11 along the pipe axis 18 in the flow direction 15, reaches the orifice plate 16 that is disposed between the first and second pipes 11, 12 attached to the annular flange 14. The fluid 13 flows through the opening 17 in the orifice plate 16 and is accelerated in the process. The fluid 13 is decelerated again downstream of the orifice plate 16 along the flow direction 15. As a result, the first and second effective pressures 23, 24, which are acquired upstream and downstream of the orifice plate 16 respectively, have different values and are a measure of the flow rate 19 present. At the periphery of its opening 17, the orifice plate 16 has an edge 43 which is subject to wear due to the flow of the fluid 13. The edge 43 causes turbulences 42 downstream of the orifice plate 16 along the flow direction 15. The turbulences 42 occur cyclically. When the turbulences 42 reach the second pipe 12, i.e., the wall thereof, they in turn cause the vibrations 21 that are acquired by the vibration sensor 20 in the second step 120 of the diagnostic method 100. The vibrations 21 caused by the turbulences 42 are also a measure of the flow rate 19 in the piping 10. For the inventive diagnostic method 100, the adjustable second threshold value 27 merely requires a simple parameter that indicates whether there is flow through the orifice plate 16. The second threshold value 27 can initially be set during commissioning of the flow measurement system 40, for example, via an estimated value, and can be adjusted more precisely during subsequent operation. This ensures sufficiently precise detection of blockages of an effective pressure line 34 and at the same time provides a learning period in which the reference state of the orifice plate 16 can be determined.

The occurrence of the turbulences 42 at the edge 43 of the opening 17 of the orifice plate 16 can be simulated in the simulation program product 65 with reduced computational complexity. The opening 17 is essentially rotationally symmetrical about the pipe axis 18. Accordingly, a fluid-dynamic displacement of the turbulences 42 at the edge 43 can be represented in a two-dimensional fluid simulation. Such two-dimensional fluid simulations require reduced computational complexity and can also be configured Oto be real-time capable. The simulation program product 65, which is formed as a digital twin, is therefore real-time capable and thus suitable for monitoring the flow measurement system 40 during operation. Alternatively, a circumferential section of the orifice plate 16 in the region of the edge 43 can be simulated in a three-dimensional fluid simulation. The circumferential section can have dimensions at which the displacement of the turbulences 42 can also be simulated with reduced computational complexity.

Figure 3:
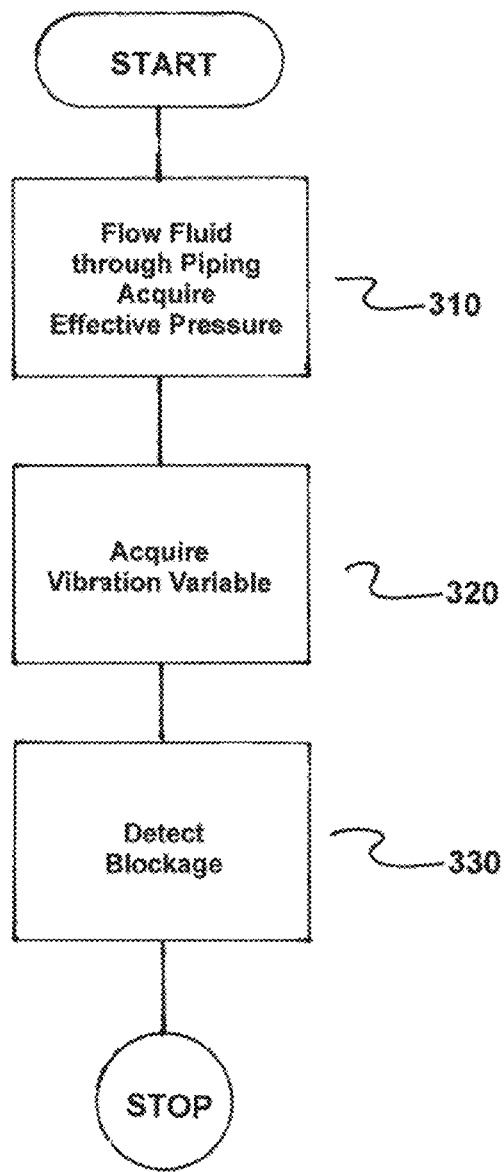
FIG. 3 is a flowchart of the inventive method.

FIG. 3 is a flowchart of the diagnostic method 100 for a flow measurement system 40 that is attached to flow-traversable piping 10 in which an orifice plate 16 is disposed, where the flow measurement system 40 comprises a flow measurement apparatus 30 that is connected to at least two effective pressure lines 34, 35, 36 disposed in a region 28 of the orifice plate 16 to acquire an effective pressure 23, 24. The method comprises a) causing a fluid 13 to flow through the piping 10 and acquiring the effective pressure 23, 24 in one pressure line of the effective pressure lines 34, 35, 36, as indicated in step 310.

Next, b) a vibration variable 22 of a vibration 21 is acquired via a vibration sensor 20 that is mounted in the region 28 of the orifice plate 16, as indicated in step 320.

Next, c) a blockage of the effective pressure line 34, 35, 36 is detected if a magnitude of the effective pressure 23, 24 acquired in step 310 is below an adjustable first threshold value 26 and a magnitude of the vibration variable 22 detected in step 320 is above an adjustable second threshold value 27, as indicated in step 330.

In accordance with the invention, a warning 39 is output to at least one of a user and a data interface 32 if a blockage of the effective pressure line 34, 35, 36 is detected.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A diagnostic method for a flow measurement system which is attached to flow-traversable piping in which an orifice plate is disposed, the flow measurement system comprising a flow measurement apparatus which is connected to at least two effective pressure lines disposed in a region of the orifice plate to acquire an effective pressure, the method comprising:

a) causing a fluid to flow through the flow-traversable piping and acquiring an effective pressure in one pressure line of the at least two effective pressure lines;

b) acquiring at least one vibration variable of a vibration via a vibration sensor which is mounted in the region of the orifice plate;

c) detecting a blockage of the one pressure line of the at least two effective pressure lines if a magnitude of the effective pressure acquired in step a) is below an adjustable first threshold value and a magnitude of the at least one vibration variable detected in step b) is above an adjustable second threshold value;

d) training an artificial intelligence based on measured values of the effective pressure and the acquired at least one vibration variable and determining a reference state of the orifice plate; and e) detecting wear of the orifice plate by comparing the reference state with at least one of an effective pressure present, at least one vibration variable present and a variable derived therefrom;

wherein a warning is output to at least one of a user and a data interface if a blockage of the one pressure line of the at least two effective pressure lines is detected.

2. The diagnostic method as claimed in claim 1, wherein the orifice plate is attached to at least one annular flange via which a first and a second pipe of the flow-traversable piping are interconnected.

3. The diagnostic method as claimed in claim 1, wherein the vibration sensor is attached to the flow-traversable piping or an annular flange.

4. The diagnostic method as claimed in claim 2, wherein the vibration sensor is attached to the flow-traversable piping or the annular flange.

5. The diagnostic method as claimed in claim 1, wherein the flow measurement apparatus is formed as a differential pressure measuring apparatus.

6. The diagnostic method as claimed in claim 1, wherein at least one pressure line of the at least two effective pressure lines has a length of 1 m to 20 m.

7. The diagnostic method as claimed in claim 1, wherein a direction of the vibration acquired by the vibration sensor is oriented perpendicular to an axial direction of the flow-traversable piping.

8. The diagnostic method as claimed in claim 1, further comprising:

f) determining a first measured value for the flow rate in the flow-traversable piping based on at least the effective pressure acquired in step a); and g) determining a second measured value for the flow rate in the flow-traversable piping based on the vibration variable acquired in step b);

wherein the first and second measured values are compared with each other for a plausibility check.

9. A non-transitory computer-readable medium which receives measured values of effective pressure and of at least one vibration variable, said non-transitory computer-readable medium being encoded with a computer program which, when executed by a processor of an evaluation unit, causes the processor to implement at least one diagnostic method on a flow measurement system which is attached to flow-traversable piping and in which an orifice plate is disposed, which comprises a flow measurement apparatus with at least two effective pressure lines, a vibration sensor, and which comprises a data interface for outputting a warning, the computer program comprising:

a) program code for acquiring an effective pressure in one pressure line of the at least two effective pressure lines;

b) program code for acquiring at least one vibration variable of a vibration via the vibration sensor which is mounted in a region of an orifice plate;

c) program code for detecting a blockage of the one pressure line of the at least two effective pressure lines if a magnitude of the effective pressure acquired in step a) is below an adjustable first threshold value and a magnitude of the vibration variable detected in step b) is above an adjustable second threshold value;

d) program code for training an artificial intelligence based on measured values of the effective pressure and the acquired at least one vibration variable and determining a reference state of the orifice plate; and e) program code for detecting wear of the orifice plate by comparing the reference state with at least one of an effective pressure present, at least one vibration variable present and a variable derived therefrom;

wherein a warning is output to at least one of a user and the data interface if a blockage of the one pressure line of the at least two effective pressure lines is detected.

10. An evaluation unit which is configured to store and execute the computer program stored in the non-transitory computer readable medium of claim 9 and which is configured to be coupled to the flow measurement apparatus and the vibration sensor via at least one communicative data link.

11. A flow measurement system comprising:

a flow measurement apparatus; and a vibration sensor which is attachable to flow-traversable piping in the region of the orifice plate, and which are connected via the at least one communicative data link to the evaluation unit in accordance with claim 10.

12. A simulation program product stored in the non-transitory computer-readable medium of a computer, said simulation program product comprising instructions which, when executed on a processor of the computer, cause the computer to simulate an operational behavior of the flow measurement system in accordance with claim 11.

13. A vibration sensor attached to flow-traversable piping in the region of the orifice plate for acquiring vibrations present, wherein the vibration sensor detects a blockage of one pressure line of at least two effective pressure lines with which an effective pressure is acquired in the region of the orifice plate to measure a flow rate in the flow-traversable piping, and wherein the vibration sensor is implemented in the flow measurement system as claimed in claim 11.

14. A diagnostic method for a flow measurement system which is attached to flow-traversable piping in which an orifice plate is disposed, the flow measurement system comprising a flow measurement apparatus which is connected to at least two effective pressure lines disposed in a region of the orifice plate to acquire an effective pressure, the method comprising:

a) causing a fluid to flow through the flow-traversable piping and acquiring an effective pressure in one pressure line of the at least two effective pressure lines;

b) acquiring at least one vibration variable of a vibration via a vibration sensor which is mounted in the region of the orifice plate; and c) detecting a blockage of the one pressure line of the at least two effective pressure lines if a magnitude of the effective pressure acquired in step a) is below an adjustable first threshold value and a magnitude of the at least one vibration variable detected in step b) is above an adjustable second threshold value;

wherein a warning is output to at least one of a user and a data interface if a blockage of the one pressure line of the at least two effective pressure lines is detected; and wherein at least one pressure line of the at least two effective pressure lines has a length of 1 m to 20 m.

15. The diagnostic method as claimed in claim 14, wherein the orifice plate is attached to at least one annular flange via which a first and a second pipe of the flow-traversable piping are interconnected.

16. The diagnostic method as claimed in claim 14, wherein the vibration sensor is attached to the flow-traversable piping or an annular flange.

17. The diagnostic method as claimed in claim 15, wherein the vibration sensor is attached to the flow-traversable piping or the annular flange.

18. The diagnostic method as claimed in claim 14, wherein the flow measurement apparatus is formed as a differential pressure measuring apparatus.

19. The diagnostic method as claimed in claim 14, further comprising:

d) determining a first measured value for a flow rate in the flow-traversable piping based on at least the effective pressure acquired in step a); and e) determining a second measured value for the flow rate in the flow-traversable piping based on the vibration variable acquired in step b);

wherein the first and second measured values are compared with each other for a plausibility check.

* * * * *